United States Patent
Chen

(10) Patent No.: US 8,976,291 B2
(45) Date of Patent: Mar. 10, 2015

(54) IMAGE SENSOR MODULE WITH SUBSTRATE DEFINING GAS PRESSURE RELIEVING HOLE AND CAMERA MODULE USING SAME

(71) Applicant: Hon Hai Precision Industry Co., Ltd., New Taipei (TW)

(72) Inventor: Shin-Wen Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 72 days.

(21) Appl. No.: 13/928,902

(22) Filed: Jun. 27, 2013

(65) Prior Publication Data

US 2014/0184902 A1 Jul. 3, 2014

(30) Foreign Application Priority Data

Dec. 28, 2012 (TW) ............................. 101151300 A

(51) Int. Cl.
 *H04N 5/225* (2006.01)
 *H01L 21/00* (2006.01)
(52) U.S. Cl.
 CPC .......... *H04N 5/2253* (2013.01); *H04N 5/2257* (2013.01)
 USPC .............................. 348/374; 348/335; 438/64
(58) Field of Classification Search
 USPC .............. 348/374, 373, 335, 340; 438/55, 64
 See application file for complete search history.

(56) References Cited

U.S. PATENT DOCUMENTS

| 7,391,002 | B2 * | 6/2008 | Sato et al. ............... 348/E5.027 |
| 2004/0239794 | A1 * | 12/2004 | Saito et al. ..................... 348/340 |
| 2005/0116138 | A1 * | 6/2005 | Hanada et al. ................ 438/406 |
| 2007/0047952 | A1 * | 3/2007 | Kim et al. ..................... 348/374 |
| 2011/0194023 | A1 * | 8/2011 | Tam et al. ..................... 348/374 |
| 2012/0039596 | A1 * | 2/2012 | Hou et al. ..................... 396/535 |
| 2014/0055651 | A1 * | 2/2014 | Chen et al. ..................... 348/294 |
| 2014/0055669 | A1 * | 2/2014 | Chen ............................. 348/374 |

* cited by examiner

*Primary Examiner* — Nhan T Tran
(74) *Attorney, Agent, or Firm* — Novak Druce Connolly Bove + Quigg LLP

(57) ABSTRACT

An image sensor module includes a ceramic substrate, an image sensor, and a filter. The ceramic substrate defines a light transmitting hole and a receiving recess communicating with the light transmitting hole. The image sensor is received in the receiving recess. The filter is positioned on the ceramic substrate.

20 Claims, 4 Drawing Sheets

IMAGE SENSOR MODULE WITH SUBSTRATE DEFINING GAS PRESSURE RELIEVING HOLE AND CAMERA MODULE USING SAME

BACKGROUND

1. Technical Field

The present disclosure relates to optical modules and, particularly, to an image sensor module and a camera module including the image sensor module.

2. Description of Related Art

Image sensor modules generally include a ceramic substrate, a filter, and an image sensor. The ceramic substrate includes an upper surface and a lower surface opposite to the upper surface. The ceramic substrate defines a light transmitting hole on the upper surface and a receiving recess on the lower surface, the light transmitting hole communicates the receiving recess. The filter is adhered to the upper surface by glue, and covers the light transmitting hole. The image sensor is received in the receiving recess, and is electrically connected to the ceramic substrate by a flip-chip package technology. The light transmitting hole is sealed by the filter and the image sensor.

However, during assembling, the glue releases a lot of air into the light transmitting hole when cured and thus a gas pressure between the filter and the image sensor is increased, which may cause the filter or the image sensor to separate from the ceramic substrate.

Therefore, it is desirable to provide an image sensor module and a camera module, which can overcome the limitations described.

DETAILED DESCRIPTION

Embodiments of the disclosure will be described with reference to the drawings.

Figure 1:
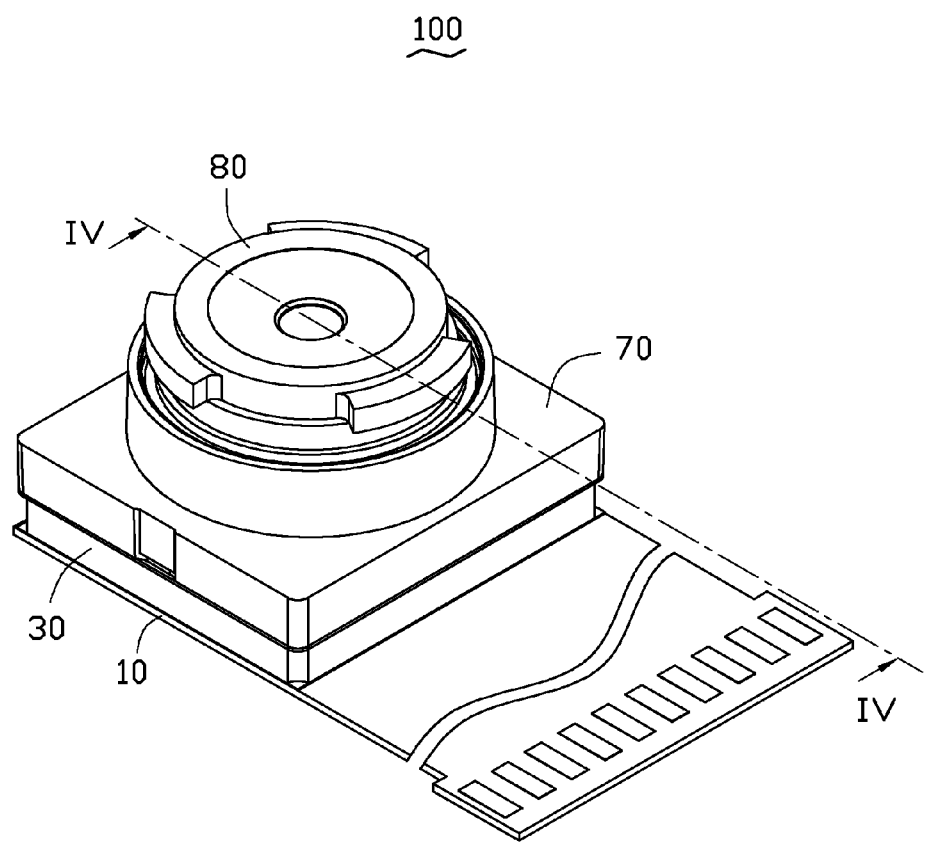
FIG. 1 is an isometric view of a camera module in accordance with an exemplary embodiment.
Figure 2:
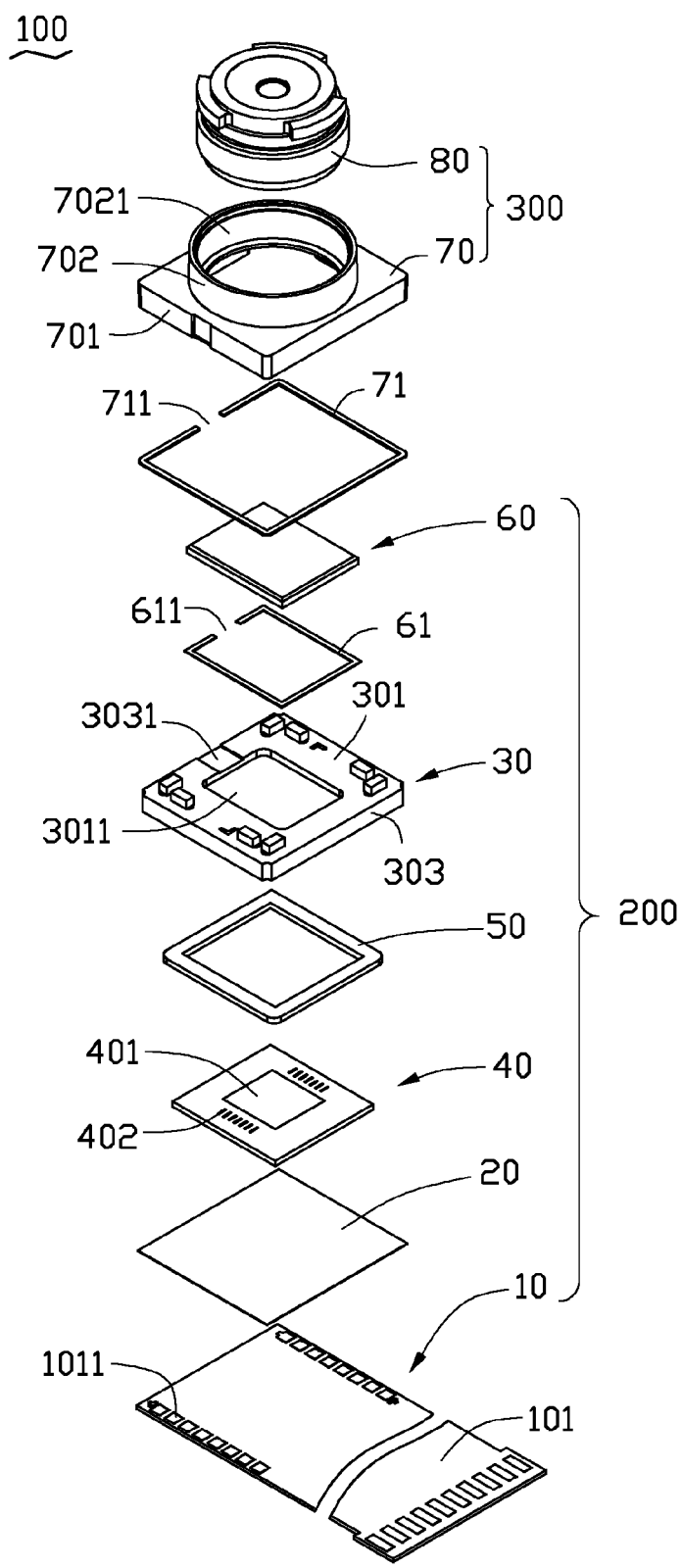
FIG. 2 is an isometric, exploded, and schematic view of the camera module of FIG. 1.
Figure 3:
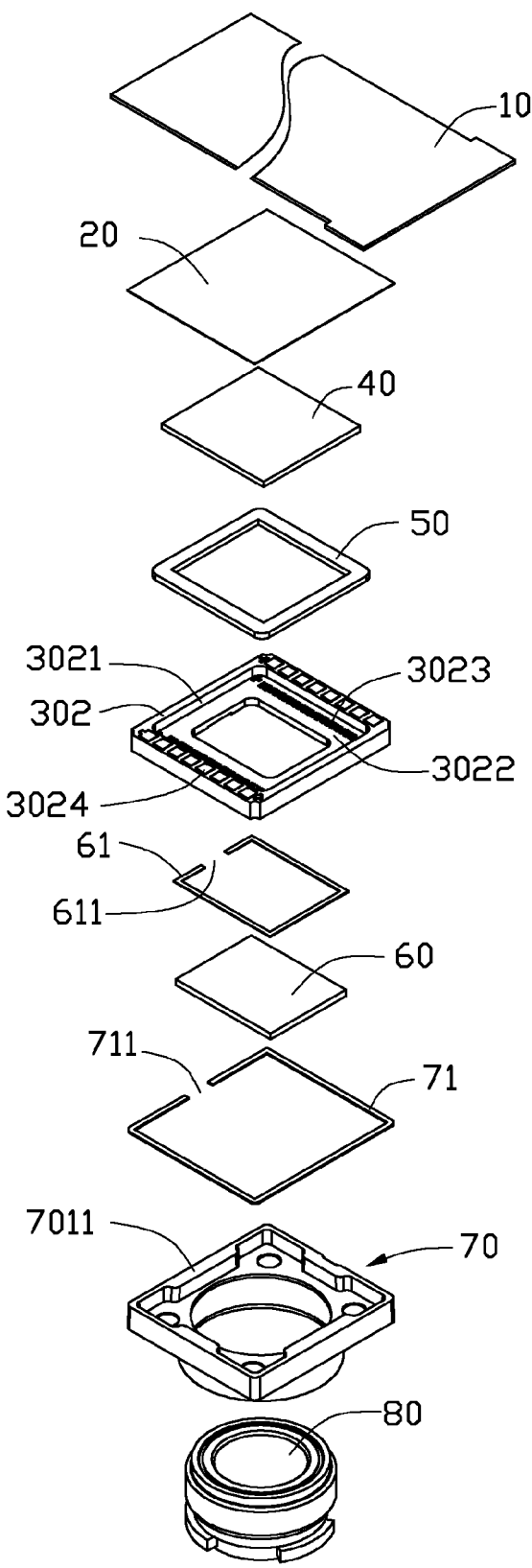
FIG. 3 shows the camera module of FIG. 1, but viewed from another angle.
Figure 4:
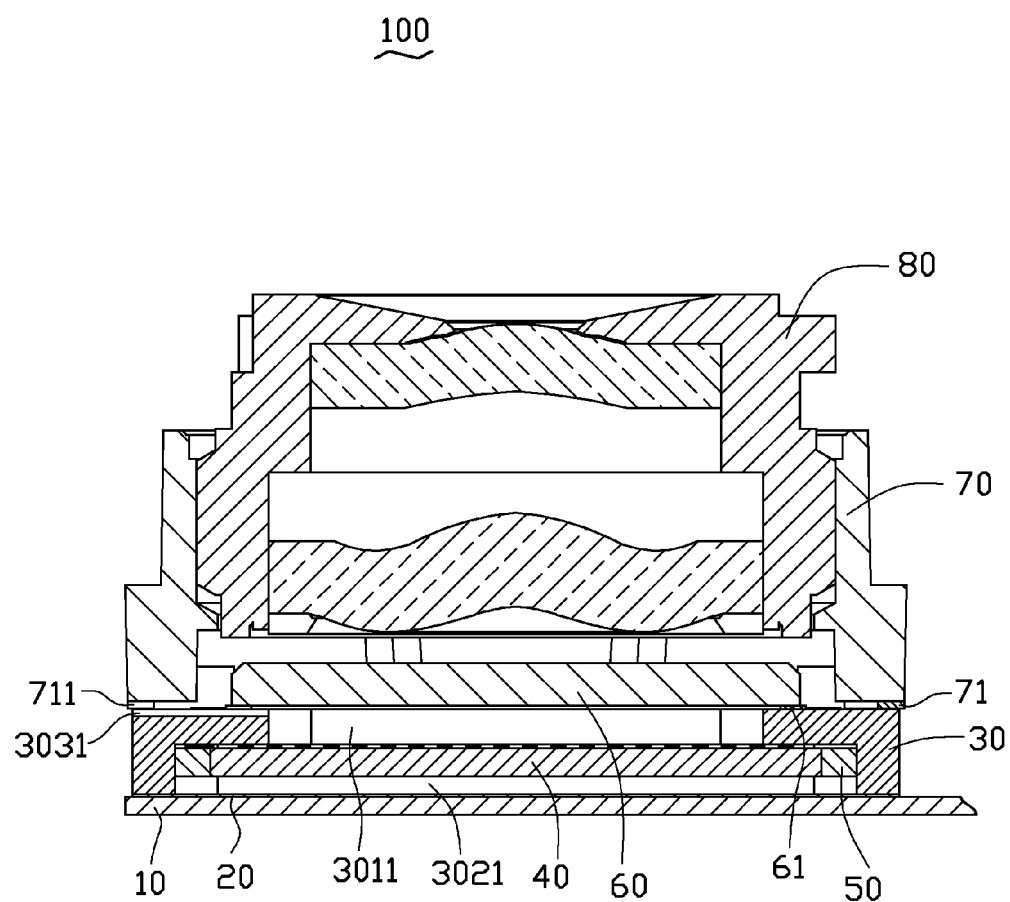
FIG. 4 is a cross-sectional view taken along a line IV-IV of FIG. 1.

FIGS. 1-4 show a camera module 100 according to an exemplary embodiment. The camera module 100 includes an image sensor module 200 and a lens module 300 positioned on the image sensor module 200. The image sensor module 200 includes a circuit board 10, a conductive film 20, a ceramic substrate 30, an image sensor 40, a filling body 50, a filter 60, and a first adhesive layer 61. The lens module 300 includes a lens holder 70, a second adhesive layer 71, and a lens unit 80.

The circuit board 10 is a flexible printed circuit board, and includes a top surface 101. A number of connecting pads 1011 are formed on the top surface 101 generally adjacent to two opposite edges of the circuit board 10. In order to improve a strength of the circuit board 10, a stiffening plate (not shown) is positioned on a side of the circuit board 10 opposite to the top surface 101.

The conductive film 20 is an anisotropic conductive film, and is adhered on the top surface 101 of the circuit board 10. The conductive film 20 is electrically connected to the circuit board 10 along a Z axes of a Cartesian coordinate, which is perpendicular to the top surface 101, and is electrically disconnected along a X-Y plane of the Cartesian coordinate which is parallel with the top surface 101.

The ceramic substrate 30 includes an upper surface 301, a lower surface 302 opposite to the upper surface 301, and a side surface 303 connected between the upper surface 301 and the lower surface 302. The ceramic substrate 30 defines a light transmitting hole 3011 on the upper surface 301, a receiving recess 3021 on the lower surface 302, and a gas pressure relieving hole 3031 on the side surface 303. The light transmitting hole 3011 communicates with the receiving recess 3021. The gas pressure relieving hole 3031 communicates with the light transmitting hole 3011. The receiving recess 3021 includes a connecting surface 3022 parallel with the upper surface 301. A number of first pads 3023 are formed on the connecting surface 3022, and a number of second pads 3024 are formed on the lower surface 302. The first pads 3023 are connected to the second pads 3024 by wires buried in the ceramic substrate 30.

The image sensor 40 includes an image surface 401 and a number of pins 402 adjacent to two opposite edges of the image surface 401. The image sensor 40 converts light rays projected on the image surface 401 into electrical signals (image signals), and the image signals are output from the pins 402. In the embodiment, the image sensor 40 can be a complementary metal-oxide-semiconductor transistor (CMOS) sensor or a charge coupled device (CCD) sensor.

The filling body 50 is a shape of a frame after curing, and the glue has the quality of opacity. The opaque glue is applied into to a mold and then is cured.

The filter 60 is rectangular, and is made of transparent materials, such as glass. The filter 60 filters out infrared light.

The first adhesive layer 61 is a frame after being cured, and is made of ultraviolet-curable adhesive. The first adhesive layer 61 defines a first gap 611 on one edge. The width of the first gap 611 is equal to or greater than the width of the gas pressure relieving hole 3031. In this embodiment, the width of the first gap 611 is equal to the width of the gas pressure relieving hole 3031. The first adhesive layer 61 is adhered on edges of one side of the filter 60.

The lens holder 70 includes a seat 701 and a receiving portion 702 positioned on one end of the seat 701. The seat 701 is a hollow cuboid and includes a bottom surface 7011. The receiving portion 702 defines a lens hole 7021 communicating with the seat 701.

The second adhesive layer 71 is also a shape of a frame after being cured, and is made of ultraviolet-curable adhesive. The second adhesive layer 71 defines a second gap 711 on one edge. The width of the second gap 711 is equal to or greater than the width of the gas pressure relieving hole 3031. In this embodiment, the width of the second gap 711 is equal to the width of the gas pressure relieving hole 3031. The second adhesive layer 71 is adhered on edges of the bottom surface 7011 of the lens holder 70. The size of the second adhesive layer 71 is greater than the size of the first adhesive layer 61.

The lens unit 80 includes at least one lens and a barrel receiving the at least one lens.

In assembling, the image sensor 40 is received in the receiving recess 3021, and the image surface 401 faces the light transmitting hole 3011. The pins 402 are electrically connected to the first pads 3023. The filling body 50 is received in the receiving recess 3021, and surrounds the image sensor 40. In the embodiment, the opaque glue is applied into the receiving recess 3021 and surrounds the image sensor 40. The lower surface 302 of the ceramic substrate 30 is supported by the top surface 101 of the circuit board 10, the second pads 3024 are electrically connected to the connecting pads 1011 with the conductive film 20. Image signals output from the image sensor 40 are output to the circuit board 10 through the pins 402, the first pads 3023, the second pads 3024, and the connecting pads 1011 in that order.

The first adhesive layer 61 is adhered on the edges of one side of the filter 60, the filter 60 is positioned on the upper surface 301 of the ceramic substrate 30 via the first adhesive layer 61, and the filter 60 covers the light transmitting hole 3011. The first gap 611 of the first adhesive layer 61 is aligned with the gas pressure relieving hole 3031 of the ceramic substrate 30. The second adhesive layer 71 is adhered on the edges of the bottom surface 7011 of the lens holder 70, the lens holder 70 is positioned on the upper surface 301 of the ceramic substrate 30 via the second adhesive layer 71. The filter 60 is received in the seat 701. The second gap 711 of the second adhesive layer 71 is aligned with the gas pressure relieving hole 3031 of the ceramic substrate 30. The lens unit 80 is received in the lens hole 7021.

In the embodiment, the first adhesive layer 61 defines the first gap 611 and the second adhesive layer 71 defines the second gap 711, and the first gap 611 and the second gap 711 are aligned with the gas pressure relieving hole 3031, the first adhesive layer 61 and the second adhesive layer 71 will not obstruct the gas pressure relieving hole 3031.

As the gas pressure relieving hole 3031 communicates the light transmitting hole 3011, any air or gas released from the first adhesive layer 61 and the second adhesive layer 71 will escape from the gas pressure relieving hole 3031 when the first adhesive layer 61 and the second adhesive layer 71 are cured. A high gas pressure between the filter 60 and the image sensor 40 will not be created, nor will barometric variations in the atmosphere affect the optical precision and relationships between the components of the camera module 100.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An image sensor module, comprising:
   a ceramic substrate comprising an upper surface, a lower surface opposite to the upper surface, and a side surface connected between the upper surface and the lower surface, the ceramic substrate defining a light transmitting hole on the upper surface, a receiving recess on the lower surface, and a gas pressure relieving hole on the side surface; the light transmitting hole communicating with the receiving recess and the gas pressure relieving hole;
   an image sensor received in the receiving recess and electrically connected to the ceramic substrate;
   a circuit board electrically connected to the lower surface of the ceramic substrate; and
   a filter positioned on the upper surface of the ceramic substrate.

2. The image sensor module of claim 1, comprising a conductive film, the lower surface of the ceramic substrate electrically connected to the circuit board via the conductive film.

3. The image sensor module of claim 1, comprising a first adhesive layer, the filter connected to the upper surface of the ceramic substrate via the first adhesive layer.

4. The image sensor module of claim 3, wherein the first adhesive layer defines a first gap aligned with the gas pressure relieving hole.

5. The image sensor module of claim 4, wherein a width of the first gap is equal to or greater than a width of the gas pressure relieving hole.

6. The image sensor module of claim 4, wherein the first adhesive layer is adhered on edges of one side of the filter.

7. The image sensor module of claim 1, wherein the receiving recess comprises a connecting surface parallel with the upper surface, the ceramic substrate comprises a plurality of first pads on the connecting surface and a plurality of second pads on the lower surface, and the first pads are correspondingly connected to the second pads.

8. The image sensor module of claim 1, comprising a filling body received in the receiving recess and surrounding the image sensor.

9. A camera module, comprising:
   a ceramic substrate comprising an upper surface, a lower surface opposite to the upper surface, and a side surface connected between the upper surface and the lower surface, the ceramic substrate defining a light transmitting hole on the upper surface, a receiving recess on the lower surface, and a gas pressure relieving hole on the side surface; the light transmitting hole communicating with the receiving recess and the gas pressure relieving hole;
   an image sensor received in the receiving recess and electrically connected to the ceramic substrate;
   a circuit board electrically connected to the lower surface of the ceramic substrate;
   a filter positioned on the upper surface of the ceramic substrate;
   a lens holder positioned on the upper surface of the ceramic substrate; and
   a lens unit receiving the lens holder.

10. The camera module of claim 9, comprising a conductive film, the lower surface of the ceramic substrate electrically connected to the circuit board via the conductive film.

11. The camera module of claim 9, comprising a first adhesive layer, the filter connected to the upper surface of the ceramic substrate via the first adhesive layer.

12. The camera module of claim 11, wherein the first adhesive layer defines a first gap aligned with the gas pressure relieving hole.

13. The camera module of claim 12, wherein a width of the first gap is equal to or greater than a width of the gas pressure relieving hole.

14. The camera module of claim 12, wherein the first adhesive layer is adhered on edges of one side of the filter.

15. The camera module of claim 11, comprising a second adhesive layer, the lens holder connected to the upper surface of the ceramic substrate via the second adhesive layer, and the filter received in the lens holder.

16. The camera module of claim 15, wherein the second adhesive layer defines a second gap aligned with the gas pressure relieving hole.

17. The camera module of claim 16, wherein a width of the second gap is equal to or greater than a width of the gas pressure relieving hole.

18. The camera module of claim 17, wherein the size of the second adhesive layer is greater than the size of the first adhesive layer.

19. The camera module of claim 9, wherein the receiving recess comprises a connecting surface parallel with the upper surface, the ceramic substrate comprises a plurality of first pads on the connecting surface and a plurality of second pads on the lower surface, and the first pads are correspondingly connected to the second pads.

20. The camera module of claim 9, comprising a filling body received in the receiving recess and surrounding the image sensor.

* * * * *